Nov. 6, 1934.  M. H. ROBERTS  1,979,904
LOCOMOTIVE BOOSTER CONSTRUCTION
Filed Oct. 18, 1932   4 Sheets-Sheet 1

INVENTOR
M. H. Roberts
BY
ATTORNEYS

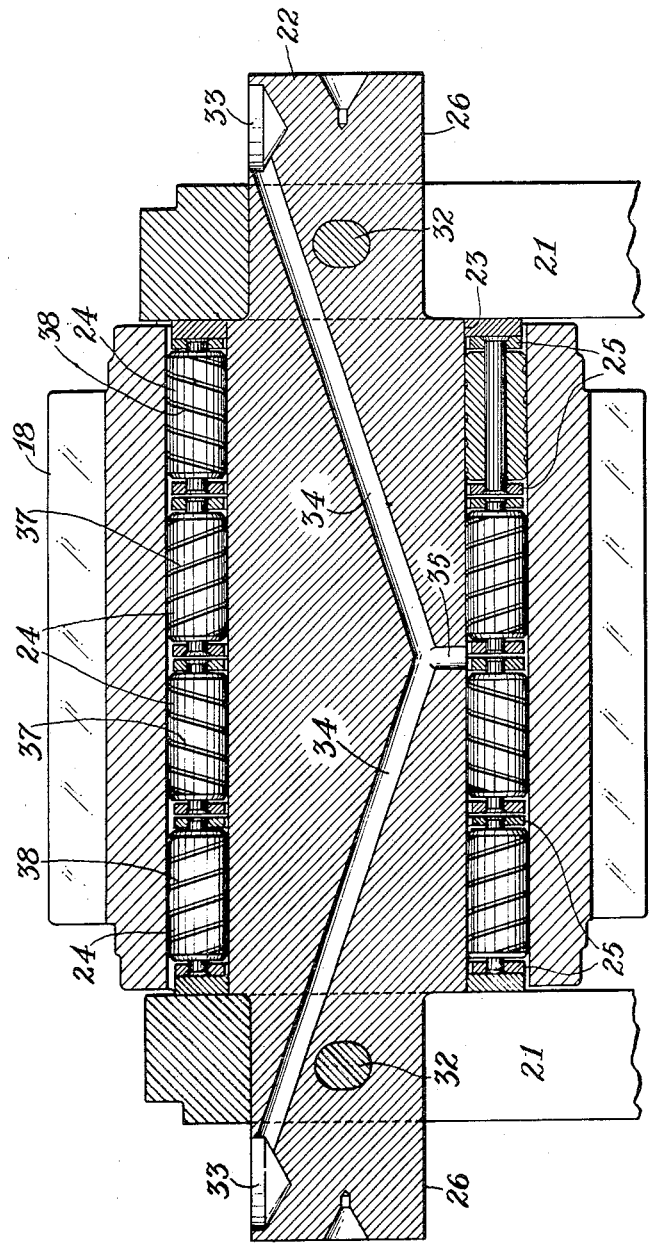

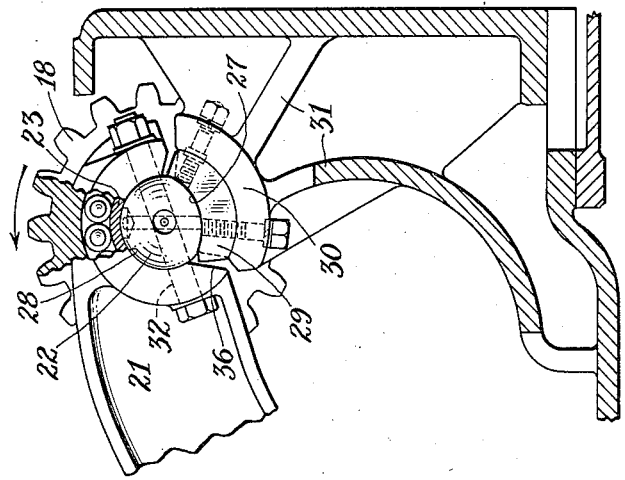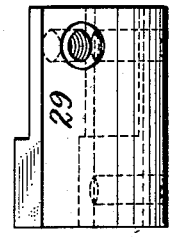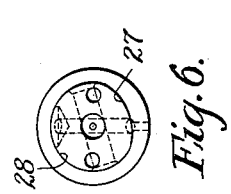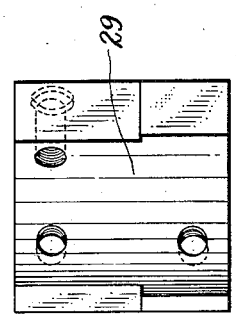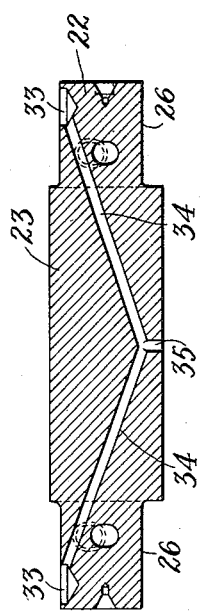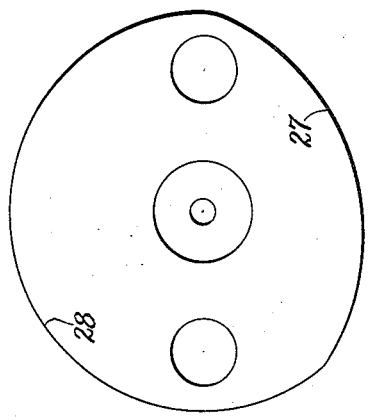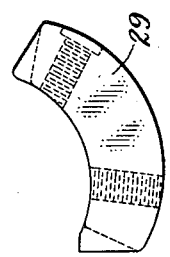

Patented Nov. 6, 1934

1,979,904

UNITED STATES PATENT OFFICE 1,979,904

LOCOMOTIVE BOOSTER CONSTRUCTION

Montague H. Roberts, Englewood, N. J., assignor to Franklin Railway Supply Company, New York, N. Y., a corporation of Delaware Application October 18, 1932, Serial No. 638,320

6 Claims. (Cl. 74—8)

This invention relates to certain improvements in locomotive booster construction and has particular reference to improvements in and to the so-called self energizing idler gear customary in the art as at present developed. As is well known, the idler gear is mounted upon a rocking member so that it can be moved into and out of mesh with a driven gear mounted upon an axle of the vehicle. Furthermore, the idler gear is constantly in mesh with the driving pinion on the crank shaft of the booster motor, and in moving into and out of mesh with the axle gear the idler gear is adapted to roll around the driving pinion.

Before stating the objects of the invention or describing its details, it is important to bear in mind that a locomotive booster motor must deliver a large amount of power and that it must be designed so as to fit into a relatively small space. In the first place, booster units of the type with which the present invention is dealing are arranged to drive an axle either of the locomotive or of the tender at a point between the wheels so that the available space in a direction longitudinally of the axle, i. e., transverse of the vehicle, is necessarily limited by the distance between wheels which, normally, is approximately 53 inches.

Furthermore, the height limitation, that is, the distance between the top of the rail and the under frame of the vehicle, less the required rail clearance, is exceedingly small—normally in the neighborhood of 25 inches. In addition, where boosters are applied to movable trucks still further restrictions are imposed upon the space available for the booster structure.

Other conditions in modern locomotive equipment as distinguished from conditions which existed some ten or twelve years ago when the booster was first extensively introduced, must also be taken into consideration. For example, in the early days of the development of the booster the average locomotive carried in the neighborhood of 200 pounds boiler pressure and the booster was designed to develop approximately 200 horsepower at this pressure. During the past ten or twelve years the steam pressures used on locomotives have gradually increased so that at the present time 250 pounds is commonly employed. With this increase in boiler pressure has come an increase in size, not only of the locomotive, but also of its tender, with a consequent increase in the amount of weight on the wheels. Other factors permitting, this increase in weight makes it possible to transmit more power without danger of slipping, so that, theoretically, at least, it should be possible at the present date to materially increase the horsepower of a booster motor.

However, the available space into which the booster may be fitted has not increased, but if anything has lessened due to other improvements in locomotive construction.

With the foregoing in mind it can be stated in a general way that one of the principal objects of the present invention is to make possible the provision of a booster of greatly increased horsepower without increasing its size and consequently the size of the space into which it must be fitted, which latter cannot be done.

More specifically stated, the objects of my invention may be said to include the provision of roller bearings for the idler gear without sacrificing the necessary strength in any of the parts associated therewith while at the same time making possible a material increase in the power developed by the booster; the provision of improved means for adequately lubricating the bearings of the idler gear; the provision of improved self centering stop construction for the idler gear rocker so that the idler gear may always assume the proper pitch relation with respect to the other gears in the train during operation of the booster; the provision of a construction in which a large measure of the stress is removed from the idler gear pin as well as from the rocker pin when the booster is driving the locomotive, and in general the provision of means for reducing the friction and increasing the efficiency of a booster motor.

In the drawings:—

Fig. 3 is a substantially vertical longitudinal section through the idler gear and the pin upon which it is mounted in order to more fully illustrate certain details of the construction, the view being still further enlarged over that which is shown in Figure 2.

Fig. 4 is a fragmentary vertical section taken transversely of the axis of the idler gear pin in order to still further bring out details of the construction.

Figs. 5 and 6 are, respectively, a longitudinal section and an end elevation of the idler gear pin.

Figure 1:
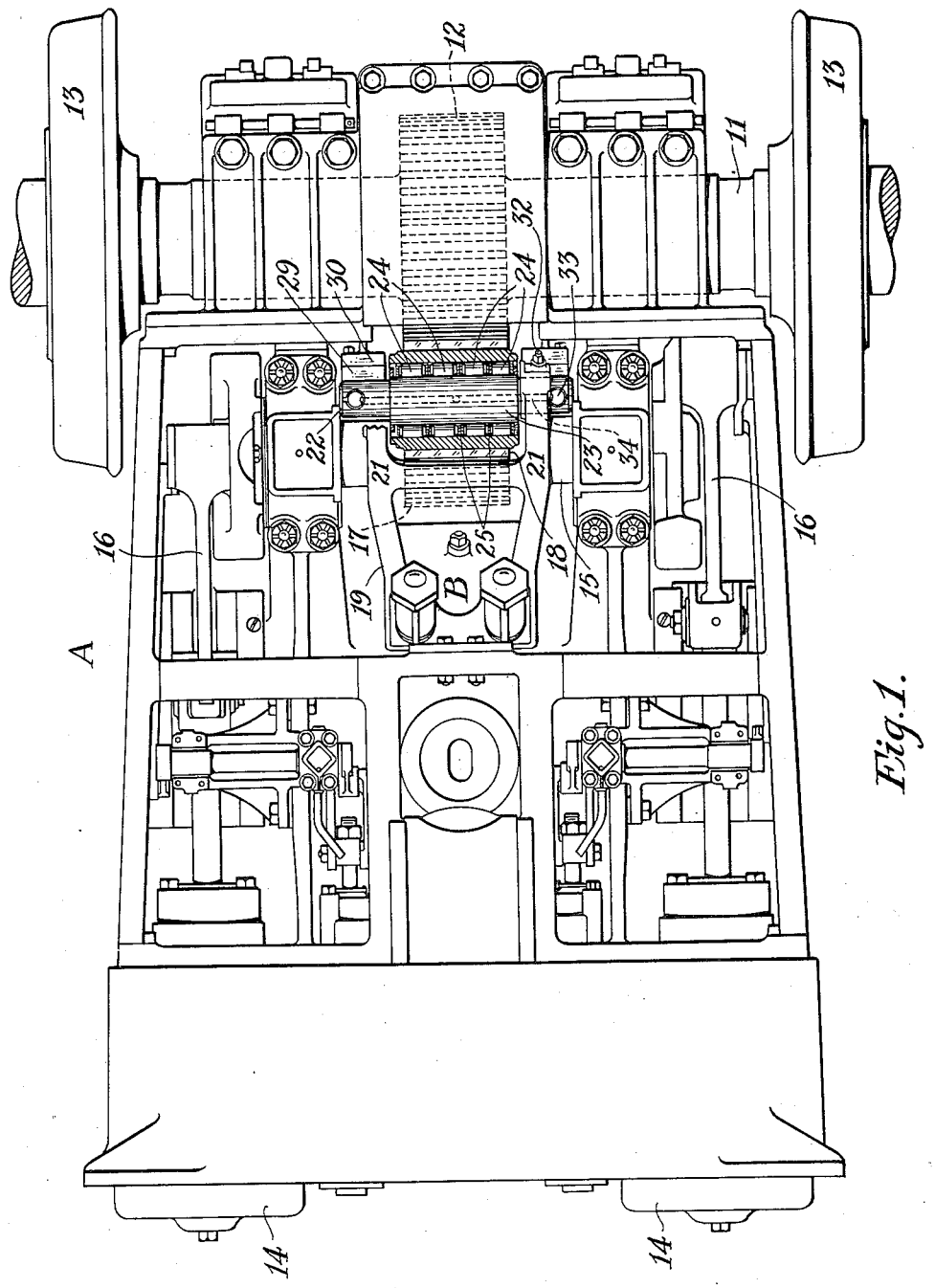
Fig. 1 is a plan view of a booster motor of the type to which my invention is applied, with certain of the parts broken away and others in section to show some of the details of the idler gear and its mounting.

Fig. 7 is a greatly enlarged end elevation of the idler gear pin in order to show more clearly the configuration of that portion of the pin which engages the stops which limit the rocking movement of the gear and properly position it with respect to the other gears of the train when the booster is in operation, and Figs. 8, 9 and 10 are, respectively, end, plan and side views of the improved detachable stop member used with my invention.

By referring to the drawings it will be seen that the booster motor A is arranged to drive the axle 11 which may be either on the locomotive or on the tender. The driven gear 12 is fixed to the axle 11 so that when the booster is operating, the wheels 13 will be rotated to aid in propelling the locomotive.

Figure 2:
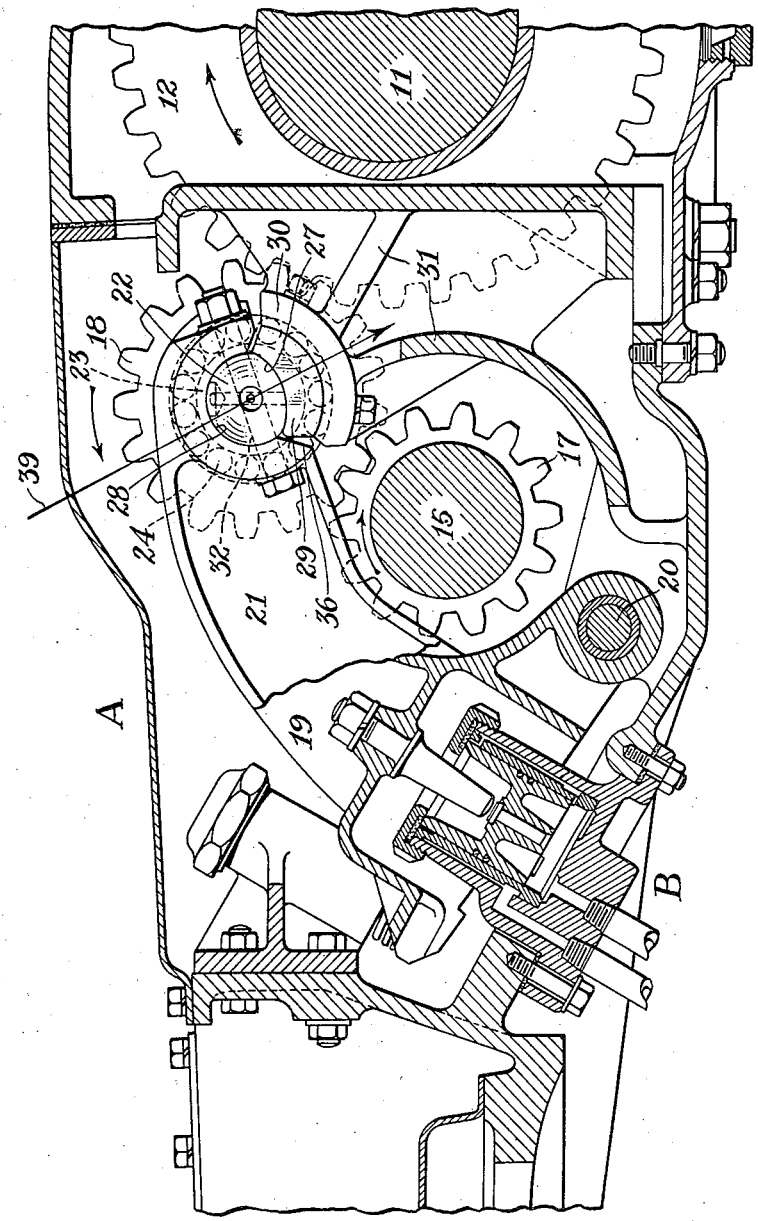
Fig. 2 is a partial side elevation and vertical section on an enlarged scale but with the rear end of the booster broken away and only a portion of the driven axle appearing.

The booster engine, of course, as is well known in the art, includes the cylinders 14 which drive the crank shaft 15 through suitable crank mechanism 16. Upon the crank shaft is fixed the customary driving pinion or gear 17. The idler gear 18 is constantly in mesh with the driving pinion 17 and is mounted upon the rocking member 19, which latter pivots upon the pin 20 in a manner familiar to those skilled in this art. Suitable mechanism B is provided, the details of which will not be described as it forms no part of the present invention, for moving the rocker 19 around the pivot 20 so as to bring the idler gear 18 into mesh with the axle gear 12. A slight excess of clearance is preferably provided at the rocker pin 20 which will aid in securing correct alignment of the gears and insure absence of stress on the parts when the booster is in operation. Figures 1, 2 and 4 show the idler gear in the position it will occupy when the booster is entrained and ready to assist in propelling the locomotive.

The rocker member 19 is provided with a pair of spaced arms 21 between which is mounted the idler gear pin 22. This pin has a central circular portion 23 of hardened steel adapted to act as the inner race for a plurality of rings of roller bearings 24. The bore of the idler gear 18 is mounted directly upon the rollers 24, the interior surface of the bore being suitably hardened to act as the outside race of the roller bearing. Each ring of roller bearings 24 may be held between suitable cage members 25 (see Fig. 3).

The reduced ends 26 of the idler gear pin are made with a portion 27 (see Fig. 7) of considerably greater radius than the portion 28, the said portion 27 being adapted to fit into and cooperate with the stop member 29 carried in the arcuate bed 30 of the booster framework 31. It will be understood, of course, that there is a stop member 29 at each end of the pin.

By making the stop members 29 detachable in the manner indicated and seating them in the arcuate bed 30, it is possible to very accurately position them, a matter which is of great importance in the proper alignment of the gears, as will appear more fully hereinafter. Furthermore, the stop members 29 can be readily replaced if necessary.

As will be seen, particularly upon inspection of Figs. 1 and 3, the reduced ends 26 of the idler gear pin project outwardly beyond the arms 21. It will also be seen that the pin is held in non-rotative engagement with the arms 21 by means of the pins 32.

In the upper surface of the projecting ends of the pin are formed oil collecting pockets 33 from which extend diagonally downward toward the center of the bottom of the enlarged portion of the pin the oil ducts or channels 34, which latter are arranged to meet in the short vertical duct 35 which delivers the lubricant approximately at the center of the roller bearings. This is most clearly shown in Fig. 3.

The outer ends of the arms 21 are provided with mutilated eye portions 36 for a purpose which will now be described. In assembling the parts the rollers 24 and the idler gear 18 are first placed upon the pin and the pin is then rotated to a position approximately 90° from that shown in the figures so that the shorter diameter of the reduced ends 26 can be passed through the mutilated eyes 36, after which the pin is returned to the position shown in the figures and secured in position by the bolts 32 already described.

It should also be noted that the use of the mutilated eyes in the manner just before set forth avoids what would otherwise be the necessity of forming very large openings in the arms 21 capable of passing the bearings therethrough. The space available does not permit of such an arrangement. It will, therefore, be seen that the mutilated eyes are a very important feature of the construction with respect to the use of roller bearings.

I prefer to use four rings of rollers 24 as shown to best advantage in Fig. 3, and it will be noted that the rollers in the two inside rings are provided with oppositely disposed spiral grooves 37. The rollers to the outside of the inner rings are also provided with oppositely disposed spiral grooves 38 and the several spirals are so arranged with relation to the direction of rotation of the idler gear 18 as to cause the lubricant which is delivered through the duct 35 to be forced outwardly from the center toward each end of the pin, as clearly shown in Fig. 3. The rollers at each end, however, will tend to force the oil back toward the center. However, the head of the incoming oil as it passes down through the cups 33, the passages 34 and the discharge duct 35, is sufficient, in addition to the effect of the spirals on the inside rollers 34, to force lubricant throughout the entire length of the roller bearings and thereby ensure adequate lubrication of the idler gear. The fact that the outer rings of rollers are arranged with spirals tending to force the oil toward the center acts to reduce the amount of end leakage without interfering with thorough lubrication.

The improved construction shown and described gives rise to the following advantages. In the first place, the use of roller bearings in the idler gear greatly increases the efficiency of the booster and, therefore, permits the transmission of greater power from the booster cylinders to the axle which it drives without in any way decreasing the size of the parts involved or impairing their strength. By hardening the surface of the pin and the inner surface of the bore of the idler gear these two surfaces act as the inner and outer races for the rollers, which is an important feature of the improvement because of the limited space available. Ordinarily roller bearings with independent races could not be employed because the gear cannot be made sufficiently large to provide a hole of the necessary diameter to receive the rollers with independent races.

The use of a plurality of rings of rollers instead of a ring of single rollers, each of which extends the entire length of the bearing, greatly improves the alignment and makes possible thorough lubrication of the bearing as a whole by virtue of the spiral grooves already described.

Furthermore, it should be noted that the incoming oil is discharged through the duct 35 at the low pressure point in the bearing. This is of great importance to the operation of the device because if this were not so the bearing could not possibly stand up under the tremendous punishment which it receives during operation of the booster. In this connection it should be borne in mind that the idler gear in a train of gears of the type herein disclosed is what has become known in this art as a self-energizing gear. That is, when the power of the booster is applied to the driving pinion 17 in the direction indicated by the arrow in Fig. 2, there is a tendency, after the idler gear has been meshed with the axle gear 12, for the idler gear to force itself down between the driving pinion and the axle gear. The power and the manner in which it is applied is responsible for this effect, the line of force being substantially as indicated by the arrow 39 in Fig. 2. In other words, just as soon as the teeth of the idler gear 18 begin to deliver power to the teeth of the axle gear 12, the forces react in such a way as to immediately bring the idler gear into full meshing position and to hold it there with enormous power.

The stops 29 are provided in order to prevent the idler gear from being jammed down in between the driving pinion 17 and the axle gear 12, and because of the tremendous power exerted it is extremely important that the idler gear be held in absolutely true pitch relation with respect to the other gears in the train. If this were not so there would be a great loss in efficiency due to unnecessary friction, as well as great danger of injury either to the gears themselves or to the bearings upon which they rotate, and particularly to the idler gear rollers of the present invention.

The configuration of the stop 29 and the corresponding shape of the ends of the idler gear pin are carefully calculated to ensure proper self alignment of the idler gear 18 and this is further aided by the slight excess of clearance at the pin 20 as already mentioned.

It is this so-called self energizing feature of the idler gear 18 which brings the low pressure point of the bearing, when the booster is in operation, at the under side of the idler gear pin approximately in the region in which the duct 35 discharges. If the discharge were not made at this point practically no lubricant could be forced into the bearing during operation of the booster, and without the spiral grooves tending to work the oil back toward the center the oil would follow the easiest course through the bearing and waste itself at the ends, the easiest course being the line of the low bearing pressure. It will be seen, therefore, that the use of one ring of long rollers could not be employed with the same measure of efficiency as is possible with a plurality of rings such as shown in the present construction because it would not be possible with the long rollers to adequately ensure thorough lubrication of the bearing as a whole.

Furthermore, the use of a plurality of rings of rollers as shown permits a much closer tolerance of fit and, specifically, the four rollers illustrated constitute a floating bearing which produces practically no end thrust.

As already intimated it should also be noted that by a slight excess of clearance at the rocker pin 20 correct alignment will always result when the idler gear pin 22 is brought against the stops and a substantial proportion of the stress during operation of the booster will be removed from the rocker pin and its bearings.

I claim:—

1. In a locomotive booster, the combination of a disengageable train of gears including one gear which is a self-energizing idler gear substantially as herein described, characterized by the fact that self centering stop members are provided for limiting the movement of said self energizing gear and further by the fact that the idler gear is mounted upon roller bearings carried by a non-rotatable pin the ends of which are arranged to seat in said self-centering stop members.

2. In a locomotive booster, the combination of a disengageable train of gears including one gear which is a self-energizing idler gear substantially as herein described, characterized by the fact that self centering stop members are provided for limiting the movement of said self energizing gear and further by the fact that the idler gear is mounted upon roller bearings carried by a non-rotatable pin the ends of which are arranged to seat in said self-centering stop members and, further, by the fact that the stop members are detachable and have their outer surfaces formed on an arc, which surface is adapted to seat upon a correspondingly shaped bed whereby accurate positioning of the stop members is made possible.

3. In structure of the character described, the combination of a pair of spaced rocker arms having mutilated eyes, an idler gear pin having its ends of lesser diameter in one direction than in a direction at right angles thereto, rollers on the pin, and an idler gear on the rollers, said ends of lesser diameter being adapted to be passed thru said eyes.

4. In structure of the character described, the combination of rocker arms having mutilated eyes, an idler gear pin with its ends curved on two different radii, and stop members with surfaces curved to correspond to the arc of greater radius.

5. A locomotive booster including in combination with an axle, a gear on the axle, a driving pinion, an idler gear rocker having spaced supporting arms, an idler gear pin non-rotatably mounted between said arms with its ends projecting beyond the arms, said ends each having a portion of the surface struck with a radius of greater dimension than the radius of the balance of the surface, stop means against which the surfaces having the greater radius are adapted to abut, bearing rollers mounted to roll on the surface of the pin between said arms and a self-energizing idler gear mounted on said rollers.

6. A locomotive booster including in combination with an axle, a gear on the axle, a driving pinion, an idler gear rocker having spaced supporting arms, an idler gear pin non-rotatively mounted between said arms with its ends projecting beyond the arms, said ends each having a portion of the surface struck with a radius of greater dimension than the radius of the balance of the surface, stop means against which the surfaces having the greater radius are adapted to abut, bearing rollers mounted to roll on the surface of the pin between said arms, a self-energizing idler gear mounted on said rollers and an oil passage extending from a projecting end through said pin to said rollers, said passage discharging into the region of low bearing pressure.

MONTAGUE H. ROBERTS.